United States Patent

Conrad et al.

[11] Patent Number: 6,060,027
[45] Date of Patent: May 9, 2000

[54] OZONE GENERATOR

[75] Inventors: Wayne Ernest Conrad; Helmut Gerhard Conrad; Ted Szylowiec, all of Hampton; Richard Stanley Philips, Courtice, all of Canada

[73] Assignee: Fantom Technologies Inc., Welland, Canada

[21] Appl. No.: 09/078,620

[22] Filed: May 14, 1998

[51] Int. Cl.[7] .................................................. B01J 19/08
[52] U.S. Cl. ........................... 422/186.07; 422/186.18; 422/186.19
[58] Field of Search .................... 422/186.07, 186.18, 422/186.19

[56] References Cited

U.S. PATENT DOCUMENTS

| | | | |
|---|---|---|---|
| 4,504,446 | 3/1985 | Kunicki et al. | 422/186.19 |
| 4,654,199 | 3/1987 | Gloor et al. | 422/186.19 |
| 4,693,870 | 9/1987 | Gloor et al. | 422/186.19 |
| 4,859,429 | 8/1989 | Nisenson | 422/186.13 |
| 4,908,189 | 3/1990 | Staubach | 422/186.19 |
| 5,008,087 | 4/1991 | Batchelor | 422/186.22 |
| 5,102,629 | 4/1992 | Hayashi et al. | 422/186.18 |
| 5,124,132 | 6/1992 | Francis, Jr. et al. | 422/186.07 |
| 5,250,177 | 10/1993 | Cho | 210/192 |
| 5,348,709 | 9/1994 | Wheatley | 422/186.07 |
| 5,354,541 | 10/1994 | Sali et al. | 422/186.07 |
| 5,458,856 | 10/1995 | Marie et al. | 422/186 |
| 5,552,125 | 9/1996 | Chamblee et al. | 422/186.07 |
| 5,630,990 | 5/1997 | Conrad et al. | 422/186.07 |
| 5,766,447 | 6/1998 | Creijghton | 205/742 |

FOREIGN PATENT DOCUMENTS

| | | |
|---|---|---|
| 1251419 | 3/1989 | Canada . |
| 2043438 | 12/1991 | Canada . |
| 2081014 | 8/1992 | Canada . |
| 2112253 | 1/1993 | Canada . |
| 2129848 | 8/1993 | Canada . |
| 2105590 | 2/1994 | Canada . |
| 2171297 | 3/1995 | Canada . |
| 1336706 | 8/1995 | Canada . |
| 2214457 | 10/1996 | Canada . |
| 2075789 | 12/1998 | Canada . |
| 369366 | 11/1989 | European Pat. Off. . |

*Primary Examiner*—Kishor Mayekar
*Attorney, Agent, or Firm*—Philip C. Mendes da Costa; Bereskin & Parr

[57] ABSTRACT

An apparatus for producing ozone from oxygen comprises a high voltage electrode connectable to a current source; a ground electrode spaced from the high voltage electrode and having an upstream end and a downstream end; a dielectric element positioned between the high voltage electrode and the ground electrode; a path for air flow positioned between the dielectric element and the ground electrode; and, a current collector positioned downstream of the high voltage electrode and comprising an extension of the ground electrode.

32 Claims, 7 Drawing Sheets

OZONE GENERATOR

FIELD OF THE INVENTION

This invention is directed to an apparatus for producing ozone from a gas mixture comprising or containing oxygen.

BACKGROUND OF THE INVENTION

Ozone generators are known which employ corona discharge to produce ozone from oxygen by action of oxygen atoms on oxygen molecules. The generators typically employ voltages in excess of 20,0000 volts and frequencies of 50 to 5,000 Hz. The high voltage transformers and the general geometry of the generators is large and they are difficult to construct and maintain. Accordingly, such ozone generators are typically assembled by hand thereby causing them to be expensive and difficult to produce in large quantities.

Overall, such generators are not adaptable for the manufacture on a high throughput basis which would be required for use of the ozone generator in an electrical apparatus for retail consumer sale. Further, such ozone generators are not suitable for inclusion in consumer appliances due to their large size and geometry.

SUMMARY OF THE PRESENT INVENTION

In accordance with the present invention there is provided an apparatus for producing ozone from oxygen comprising a high voltage electrode connectable to a current source, a ground electrode spaced from the high voltage electrode and having an upstream end and a downstream end, a dielectric element positioned between the high voltage electrode and the ground electrode and defining a path for air flow between the dielectric element and the ground electrode; and, a current collector positioned downstream of the high voltage electrode and comprising an extension of the ground electrode.

In one embodiment, the current collector is integrally formed as part of the ground electrode. Preferably, the portion of the ground electrode that extends downstream beyond the high voltage electrode is at least ten times the transverse width of the air flow path downstream of the high voltage electrode.

In another embodiment, the dielectric element substantially encases the high voltage electrode. The dielectric element may encase all but the upstream end of the high voltage electrode. Preferably, the dielectric element is positioned adjacent the high voltage electrode to define a dead air space therebetween.

In a further embodiment, the ground electrode surrounds the dielectric element, the high voltage electrode is positioned in the dielectric element and positioning members are provided to maintain the high voltage electrode substantially centrally positioned within the ground electrode.

In another embodiment, the ozone generator further comprises an upstream end member and a downstream end member. The ground electrode extends between the end members and surrounds the dielectric element. The high voltage electrode is positioned in the dielectric element and positioning members associated with at least one of the end members are provided to maintain the high voltage electrode substantially centrally positioned within the ground electrode. Preferably, one of the positioning members is provided adjacent the end of the high voltage electrode and the beginning of the current collector. In another embodiment, the upstream end member has an air inlet and the downstream end member has an air outlet, and an air flow path extends from the air inlet, through the path between the ground electrode and the dielectric element, through the current collector and through the air outlet. The positioning members may engage only a portion of the dielectric element to define a space between the positioning members and the dielectric element for air flow therethrough.

In another embodiment, the ozone generator further comprises an electrically conductive engagement member connectable to a current source. The high voltage electrode has a tail portion extending outwardly from the dielectric element and engageable with the electrically conductive engagement member. The high voltage electrode is connectable to the current source via the engagement of the electrically conductive engagement member and the tail portion, whereby the engagement of the electrically conductive engagement member and the tail portion maintains the high voltage electrode in the dielectric element. The upstream end member may have an air inlet and the electrically conductive engagement member may be positioned in the air inlet to define a electrically conductive gas conduit.

In another embodiment, an outer member is spaced from the dielectric element to define a fluid flow path between the outer member and the dielectric element through which a cooling fluid may flow. Preferably, the outer member comprises a second dielectric element.

In another embodiment, the ozone generator further comprises an electrically conductive engagement member connectable to a current source and a heat sink associated with the electrically conductive engagement member. The high voltage electrode is thermally and electrically connected to the electrically conductive engagement member.

The current source may be selected from a source for producing an alternating current, a source for producing a direct current and a source for producing a pulsed direct current.

In accordance with an alternate embodiment of the instant invention, there is provided an apparatus for producing ozone from oxygen comprising a high voltage electrode connectable to a current source, a ground electrode spaced from the high voltage electrode and having an upstream end and a downstream end, a dielectric element positioned between the high voltage electrode and the ground electrode and spaced from the ground electrode to define an air flow path between the dielectric element and the ground electrode; and, an upstream end member having an air inlet, positioning members extending between the upstream end member and the dielectric element to position the upstream end of the dielectric element spaced from the ground electrode, and openings extending from the air inlet to the air flow path.

In accordance with an alternate embodiment of the instant invention, there is provided an apparatus for producing ozone from oxygen comprising a dielectric element having an opening, a high voltage electrode, at least a portion of the high voltage electrode positioned in the opening of the dielectric element, the high voltage electrode having a first engagement member, a ground electrode spaced from the dielectric element and having an upstream end and a downstream end, an path for air flow extending between the dielectric element and the ground electrode; and, an upstream end member having a second engagement member, the engagement of the first and second members maintaining the high voltage electrode in position relative to the dielectric element.

The ozone generator may further comprise an electrically conductive member connectable to a current source. The upstream end member may have a recess therein for receiving the electrically conductive member with the first engagement member electrically connecting the high voltage electrode to the electrically conductive member when the first and second members are engaged. Preferably, the electrically conductive member comprises the second engagement member and the recess extends through the upstream end member and is sized for allowing passage of the high voltage electrode therethrough. In this embodiment, the ozone generator may further comprise a downstream end member having an air outlet and the recess may comprise an air inlet. An air flow path may thus extend from the air inlet, through the path between the ground electrode and the dielectric element and through the air outlet.

An advantage of the instant invention is that it produces an ozone generator which has a size sufficiently compact so as to be incorporated into various consumer sized electrical appliances such as vacuum cleaners, water filters, air filters and the like. It is known that ozone is an effective disinfectant. However, prior art ozone generators have been too cumbersome and too difficult to manufacture for inclusion in consumer appliances. By using an ozone generator according to the instant invention, an ozone generator may be included in consumer appliances in any situation where it may be desirable to disinfect a fluid stream.

DESCRIPTION OF THE DRAWINGS

These and other advantages of the instant invention will be more fully and particularly understood in connection with the following description of the preferred embodiments of this invention in which.

DESCRIPTION OF THE PREFERRED EMBODIMENT

Figure 1:
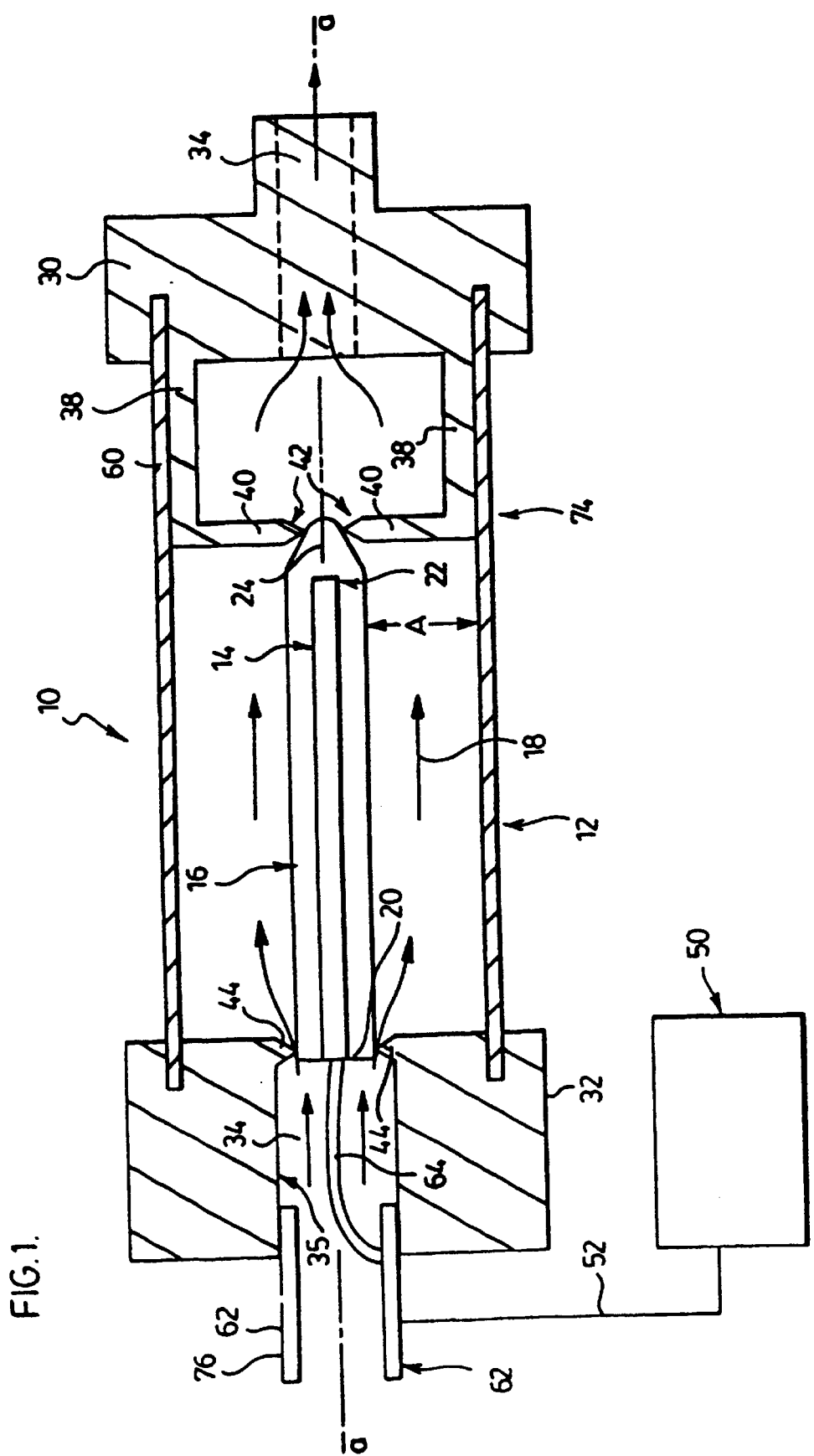
FIG. 1 is a schematic diagram showing a longitudinal cross-section through an ozone generator according to the instant invention.

As shown in FIG. 1, ozone generator 10 comprises a ground electrode 12, a high voltage electrode 14 and a dielectric element 16.

While it is appreciated that the drawings are not to scale, ozone generator 10 as shown in the preferred embodiment is sized to be sufficiently small to fit in a variety of standard consumer electrical appliances including, without limiting the uses of ozone generator 10, vacuum cleaners, water filters and/or purifiers, air filters and/or purifiers, medical disinfection, and waste water disinfection. Accordingly, ozone generator 10 may weigh from about 0.25 lbs to about 10 lbs. Despite its limited size, such an ozone generator is capable of producing, for example, from about 0.4 to about 10 g ozone per hour. Such amounts may be used to provide effective disinfectant for various fluid flow streams.

Dielectric element 16 is positioned between high voltage electrode 14 and ground electrode 12 to define a path for air flow 18 between dielectric element 16 and ground electrode 12.

The high voltage electrode and the ground electrode may be any electrode which are known in the art. For example, the electrodes may be made from any materials known in the art and, preferably, are made from stainless steel. The dielectric element may be any dielectric which is known in the art and preferably is a mullite dielectric element.

Path 18 has a transverse width A which is of a size, given the efficiency of ozone generator 10, sufficient to produce the desired amount of ozone. The voltage which is applied to high voltage electrode will vary depending, inter alia, upon the size of transverse width A to provide sufficient current to convert the oxygen to ozone. Preferably, transverse width A may vary from about 0.005 inches to about 0.75 inches and, more preferably, from about 0.025 inches to about 0.075 inches. Preferably, transverse width A is substantially constant from upstream end 20 of high voltage electrode 14 to downstream end 22 of high voltage electrode 14.

Figure 7:
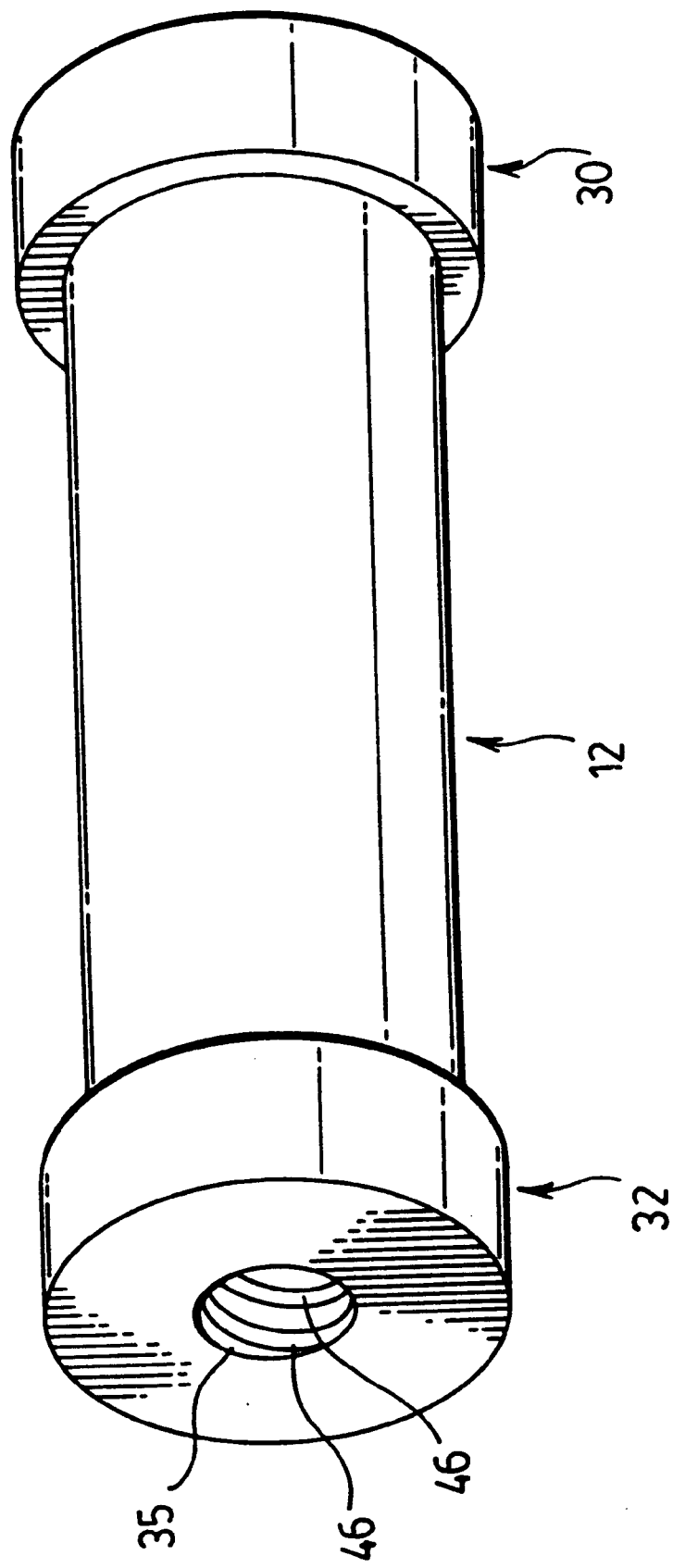

High voltage electrode 14 and ground electrode 12 may be of any particular configuration. Preferably, as shown in FIG. 7, ground electrode 12 substantially surrounds and, most preferably, completely surrounds high voltage electrode 14. Accordingly, in this preferred embodiment, ground electrode 12 may be in the shape of a longitudinally extending cylinder having a longitudinally extending axis a—a with high voltage electrode 14 positioned therewithin. Preferably, high voltage electrode 14 is centrally located along longitudinally extending axis a—a of ground electrode 12.

Dielectric element 16 is positioned along the surface of high voltage electrode 14 facing ground electrode 12. Dielectric element 16 preferably substantially surrounds and, most preferably, completely surrounds high voltage electrode 14. If ground electrode 12 is cylindrical in shape, then dielectric element 16 will preferably be cylindrical in shape to surround all faces high voltage electrode 14 facing ground electrode 12. Thus, dielectric element 16 substantially encases high voltage electrode 14. Preferably, dielectric element 16 also has an end 24 to surround downstream end 22 of high voltage electrode 16 as is shown in FIG. 1. Thus, dielectric element 16 encases all but upstream end 20 of high voltage electrode 16.

Dielectric element 16 is preferably positioned to create a dead air space between high voltage electrode 14 and dielectric element 16. In order to create a dead air space between dielectric element 16 and high voltage electrode 14, dielectric element 16 may be positioned adjacent to high voltage electrode 14. If ground electrode 12 and high voltage electrode 14 are cylindrical in shape, then dielectric element 16 may be formed as a tubular member with a longitudinally extending opening provided therein for receiving high voltage electrode 14. The inner surface of the opening in dielectric element 16 is preferably slightly larger than the outer diameter of high voltage electrode 14 so as to allow high voltage electrode 14 to be easily insertable into dielectric element 16. Dielectric element 16 may be provided with an end 24 so as to provide a surface against which downstream end 22 of high voltage electrode 14 may abut when high voltage electrode 14 is fully inserted therein.

Figure 2:
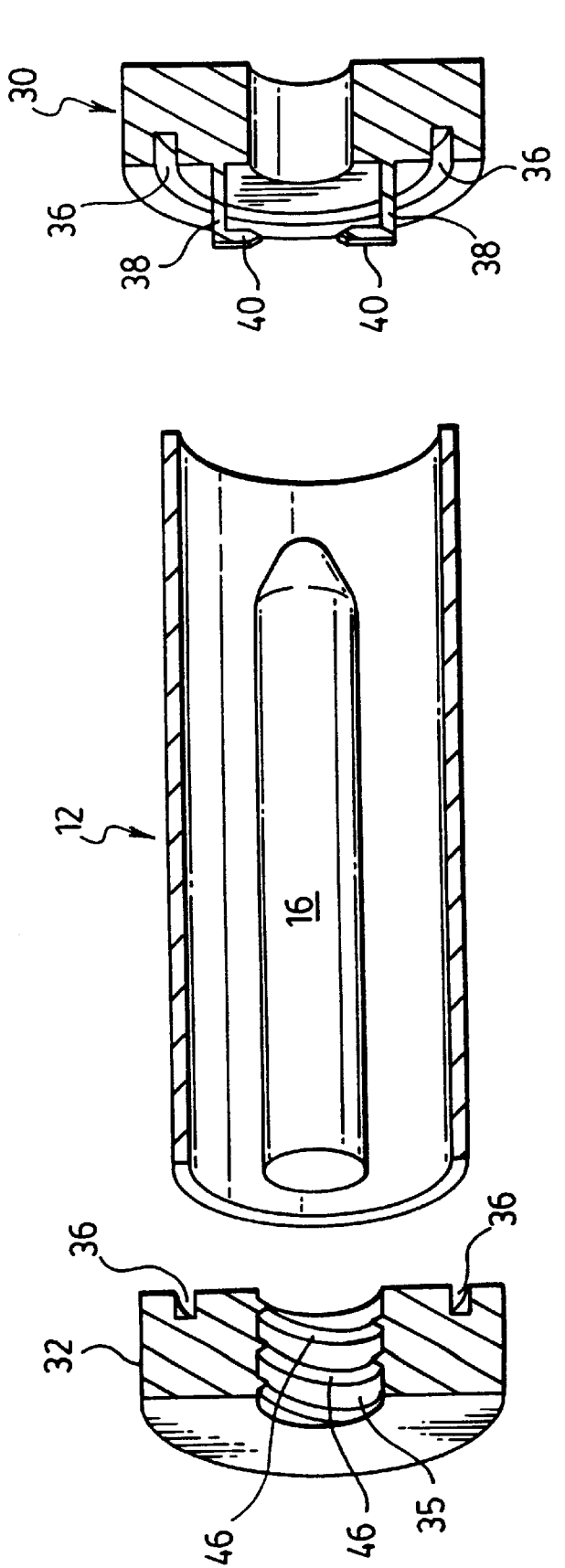
FIG. 2 is a partial longitudinal cross-section of the electrodes and the end members of the ozone generator of FIG. 1.

End caps 30 and 32 may be connected to ground electrode 12 in a variety of manners. Preferably, as shown in FIG. 2, each end cap 30, 32 is provided with an annular recess 36 which is sized so as to receive and have seated therein an end of ground electrode 12. Recesses 36 may be sized so as to be slightly smaller than the wall thickness of ground electrode 12 so as to retainingly receive therein ground electrode 12. Alternately, other means of securing ground electrode 12 in recess 36 may be used such as an adhesive or other bonding method as well as various mechanical means.

Ozone generator 10 also includes means for positioning high voltage electrode 14 relative to ground electrode 12. Various means known in the art may be used. In the preferred embodiment, ozone generator 10 is provided with downstream end cap 30 and upstream end cap 32. Each end cap 30, 32 is configured so as to be connectable to ground electrode 12 and define air flow path 18 therethrough. Accordingly, end caps 30 and 32 preferably seal the upstream and the downstream ends of air flow path 18 and are provided with openings therethrough to provide an air entry into air flow path 18 and an air exit from air flow path 18.

In particular, each end cap 30, 32 may be provided with an opening 34 extending therethrough. In the case of upstream end cap 32, opening 34 defines an air inlet through which air may pass so to enter air flow path 18. With respect to end cap 30, opening 34 defines an air exit through which the air passes as it exits air flow path 18. Preferably, openings 34 are centrally positioned with end caps 30, 32. However, it will be appreciated that one or more openings 34 may be provided at any desired location in each end cap 30 and 32 provided they provide a sufficiently large air flow passage way to air flow path 18.

Position members are provided so as to locate high voltage electrode 14 at a defined distance from ground electrode 12. End caps 30 and 32 may have position members associated therewith to position upstream end 20 and downstream end 22 of high voltage electrode 14. Referring to FIG. 1, end cap 30 may have arm members 38 extending longitudinally inwardly therefrom. Radially inwardly extending arm members 40 are positioned at the distal end of arm members 38 from end cap 30. Radially inwardly extending arm members 40 secure the downstream end 22 of high voltage electrode 14 within ground electrode 12. Preferably, arms 40 engaged end 24 of dielectric element 16.

Arm members 40 may comprise a number of distinct, spaced apart thin members spaced around end 24 so as to define an air flow path therebetween. Alternately, arm members 40 may be a single circular member which contacts the entire perimeter of end 24 or contacts a substantial portion of the perimeter of end 24. In order to allow air to pass downstream from high voltage electrode 14, one or more openings 54 may be provided in arm member 40 to allow air flow therethrough (see FIG. 3). Alternately, inner surface 42 of arm members 40 may have a screw thread provided thereon so as to define a helical path through which air may flow between arm members 40 and dielectric element 16.

Figure 5:
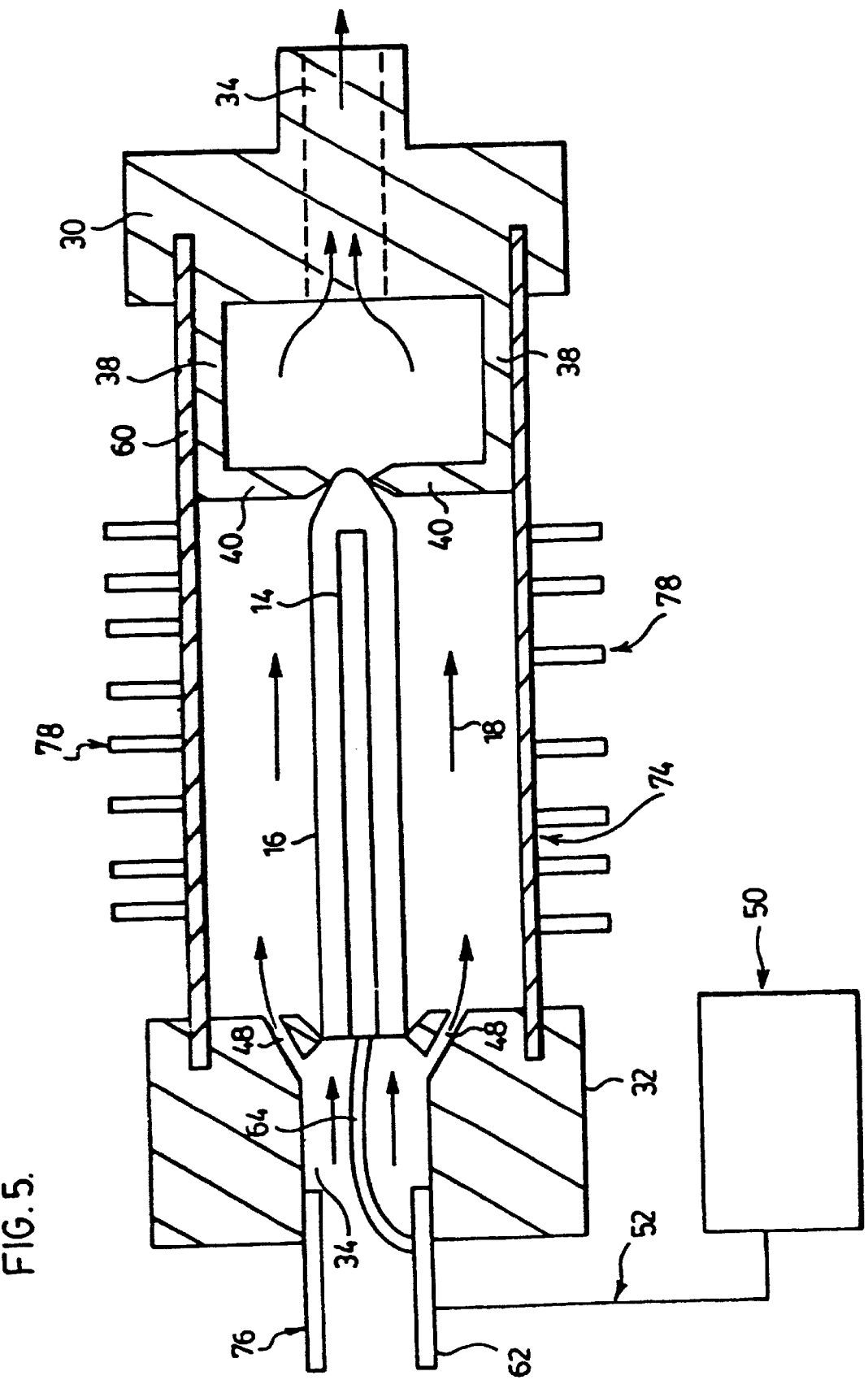
FIG. 5 is a third alternate embodiment of the ozone generator showing a second method of cooling one of the electrodes.

Similarly, upstream end cap 32 is also preferably provided with positioning members so as to fix upstream end 20 of high voltage electrode 14 in position with respect to ground electrode 12. Referring to FIG. 1, upstream end cap 32 may be provided with radially inwardly extending arm members 44 which contact the upstream end of dielectric element 16. Alternately, as shown in FIG. 2, the inner surface of opening 34 may be provided with a helically extending thread 46 which extends inwardly from at least a portion of inner surface 35 of opening 34 to a position where it will engage the outer surface of dielectric element 16, thus defining a helical air flow path between end cap 32 and dielectric element 16 as shown by the arrows in FIG. 1. Referring to FIG. 5, end cap 32 may alternately be provided with one or more openings 48 extending from opening 34 to air flow path 18.

High voltage electrode 14 is connected to a current source 50, which may be a transformer or other device as known in the art. Current source 50 may operate at from about 3 to about 25 Kv, more preferably from about 3 to about 6 Kv and, most preferably, from about 4 to about 5 Kv. Further, current source 50 may be operated at a frequency from about 50 Hz to about 100 Khz and, more preferably, from about 10 Khz to about 20 Khz. As the frequency of current source 50 is decreased, the ozone output per unit area of the ozone generator decreases. Conversely, as the frequency of current source 50 increases, excessive heating can occur and this results in a consequential decrease in the conversion of oxygen to ozone. Accordingly, it is most preferred that current source 50 operates from about 12 Khz to about 20 Khz.

Current flows from current source 50 through electrical conduit 52 to high voltage electrode 14. The current source is selected from a source for producing an alternating current, a source for producing a direct current and a source for producing a pulsed direct current. More preferably, the current source is either a source for producing an alternating current or a source for producing a pulsed direct current. When ozone is required, a fluid containing oxygen, preferably a gas and, more preferably air, is passed through opening 34 in end cap 32, into air flow path 18. The corona discharge between high voltage electrode 14 and ground electrode 12 produces ozone. The ozone enriched fluid travels along air flow path 18 and subsequently through opening 34 in downstream end cap 30.

The corona discharge in air flow path 18 produces an excess of ionized gas. In order to prevent stray electrical currents, a current collector is preferably positioned downstream of high voltage electrode 14. In accordance with one embodiment of the instant invention, current collector 60 is positioned downstream of high voltage electrode 14 and upstream of end cap 30. Current collector 60 may comprise an extension of air flow path 18. Preferably, ground electrode 12 extends past high voltage electrode 14 so as to run parallel with current collector 60. Accordingly, the current collector is formed as an integral part of ground electrode 12. More preferably, the portion of ground electrode 12 which extends downstream beyond high voltage electrode 14 is at least 10 times transverse width A of air flow path 18 and more preferably, the ratio is at least 15 to 1. Radially inwardly extending arm members 40 are preferably positioned adjacent downstream end 22 of high voltage electrode 14 so as to define the beginning of current collector 60. In this embodiment, the air passes from air flow path 18, through current collector 60 and then through opening 34 to exit ozone generator 10.

High voltage electrode 14 is connectable to current source 50. As shown in FIG. 1, ozone generator 10 may also be provided with one or more electrically conductive members 62. Electrical conduit 64 extends from upstream end 20 of high voltage electrode 14 to electrically conductive member 62. Accordingly, when the ozone generator is actuated, current flows from current source 50, through electrical conduit 52, through electrically conductive member 62, and through electrical conduit 64 to high voltage electrode 14.

Electrically conductive member 62 may comprise a cylindrical member which is mounted to or affixed to inner surface 35 of opening 34 thus defining an electrically conductive gas conduit in advance of air flow path 18. In an alternate embodiment, the plurality of distinct electrically conductive member 62 may be provided.

One advantage of this construction in the simplified assembly of the ozone generator. For example, ground electrode 12 may be connected to end caps 30 and 32 so as to define a longitudinally extending structure. High voltage electrode may be connected to electrically conductive members 62 by any means known in the art. Dielectric member may be mounted in ozone generator 10 and, subsequently, high voltage electrode 14 together with electrically conductive member 62 may be inserted into the position shown in FIG. 1 thus securing high voltage electrode 14 in the pre-selected position within ground electrode 12. Alternately, high voltage electrode 14 may be inserted into dielectric element 16 subsequent to which dielectric element 16 and high voltage electrode 14, together with electrically conductive member 62, may be simultaneously positioned in ozone generator 10. Subsequent to mounting electrically conductive member 62 in opening 34, the electrical connection of high voltage electrode 14 to current source 50 may be completed by connecting electrical conduit 52 to electrically conductive member 62.

In a more preferred embodiment, the high voltage electrode has a first engagement member 66 connected thereto and upstream end cap 32 has a second engagement member 68 associated therewith. First and second engagement members are co-operatively designed so as to engage and retain high voltage electrode 14 in position in ozone generator 10. More preferably, first engagement member 66 is an electrically conductive member so that it functions to both maintain high voltage electrode 14 in position in ozone generator 10 and, at the same time, electrically connects high voltage electrode 14 to current source 50.

Figure 3:
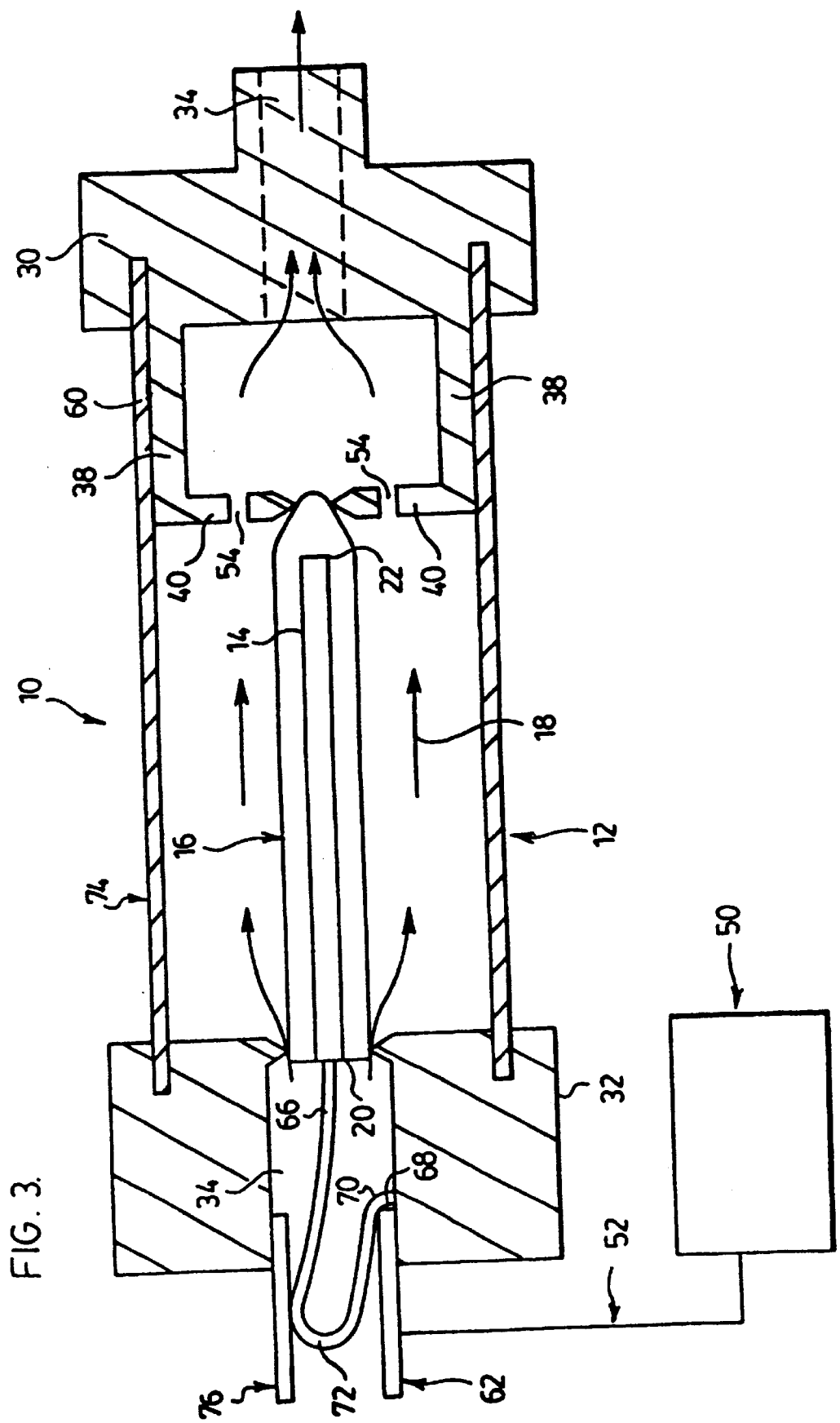
FIG. 3 is a first alternate embodiment of the ozone generator of FIG. 1 showing an alternate electrical connecting member for the high voltage electrode.

In the embodiment shown in FIG. 3, first engagement member 66 comprises a tail portion which extends upstream from upstream end 20 of high voltage electrode 14. The tail portion has a resiliently high portion 72 and a hook portion 70. First engagement member 66 is preferably made of an electrically conductive member so as to electrically connect high voltage electrode 14 to current source 50. Second engagement member 68 may comprise the downstream end of electrically conductive member 62. This construction simplifies the assembly of the ozone generator. In particular, after ground electrode 12 and end caps 30 and 32 have been connected together, electrically conductive member 62 may be inserted into opening 34. At that time, high voltage electrode (either together with or subsequent to the insertion of dielectric element 16 into position in ozone generator 10) is inserted into position in ozone generator 10. As tail portion enters opening 34 in upstream end cap 32, resiliently biased portion 72 and hook portion 70 engage electrically conductive member 62. The contact between hook portion 70 and electrically conductive member 62 compresses resiliently biased portion 72 radially inwardly. Further insertion of high voltage electrode 14 into position in ozone generator 10 continues until hook portion travels past the downstream portion of electrically conductive member 62. At this time, the compressive forces in resilient biased portion 72 cause hook portion 70 to travel radially outwardly to the position shown in FIG. 3. Further, the compressive forces in resiliently biased portion 72 maintain engagement between hook portion 70 and of electrically conductive member 62 thus lockingly engaging high voltage electrode 14 in position in dielectric element 16. It will be appreciated that by insertion of an appropriate tool or otherwise, hook portion 70 may be forced radially inwardly so that high voltage electrode 14 may be withdrawn from position in dielectric element 16 as may be required to service or repair the unit.

Figure 6:
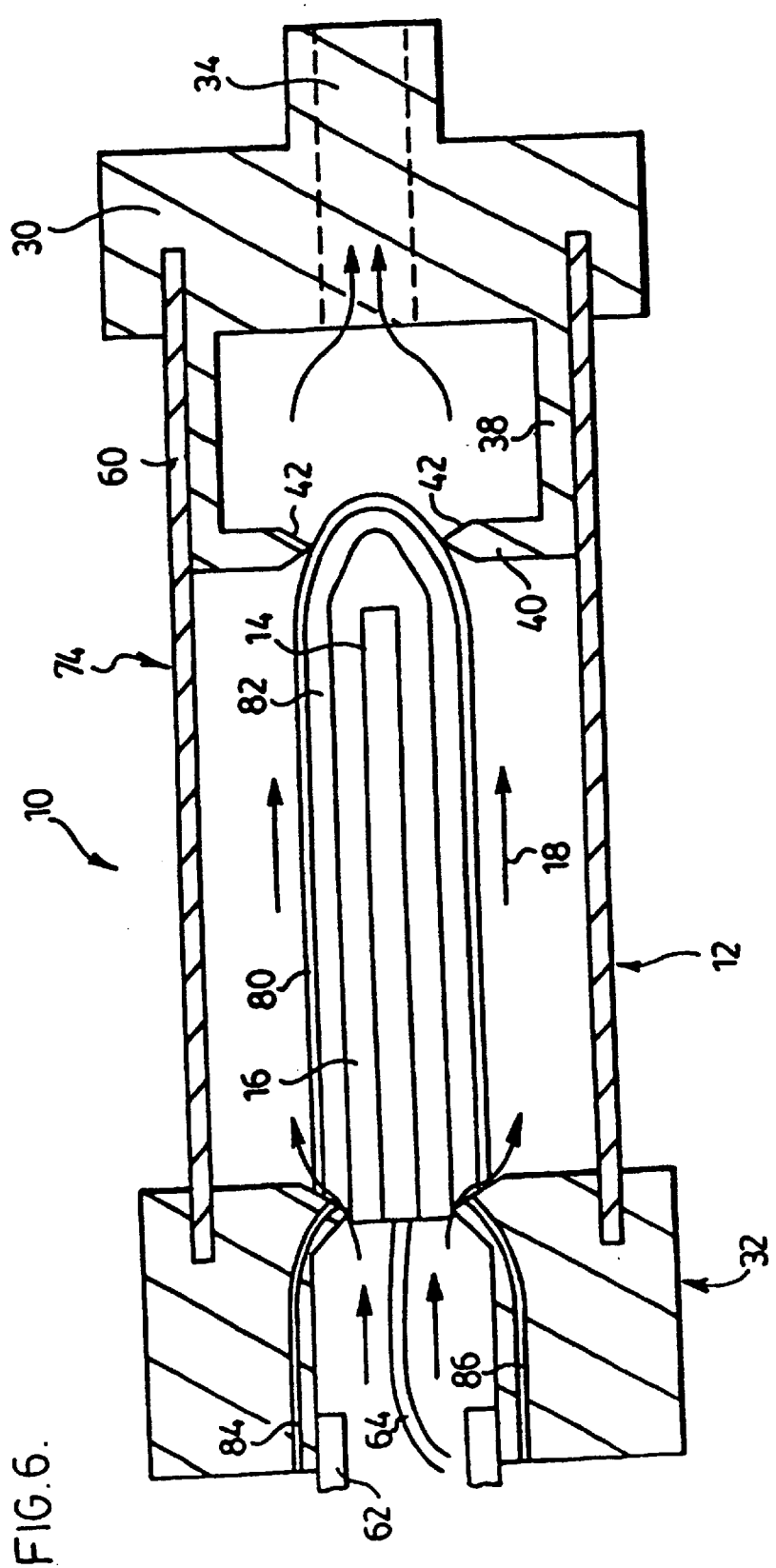
FIG. 6 is a fourth alternate embodiment of the ozone generator showing a third method of cooling one of the electrodes; and, FIG. 7 is a perspective view of the ozone generator of FIG. 1.

During the operation of ozone generator 10, heat will be produced. Some of this heat may be dissipated by the passage of air through air flow path 18. However, excess heat may build up. In such cases, a heat sink may be provided to prevent overheating of ozone generator 10. The heat sink may be provided in contact with electrically conductive member 62, (for example, as shown in FIG. 4), alternatively, it may be provided in contact with ground electrode 12, (for example, as shown in FIG. 5), or alternatively, the heat sink may be provided in contact with high voltage electrode 14 (for example, as shown in FIG. 6).

Figure 4:
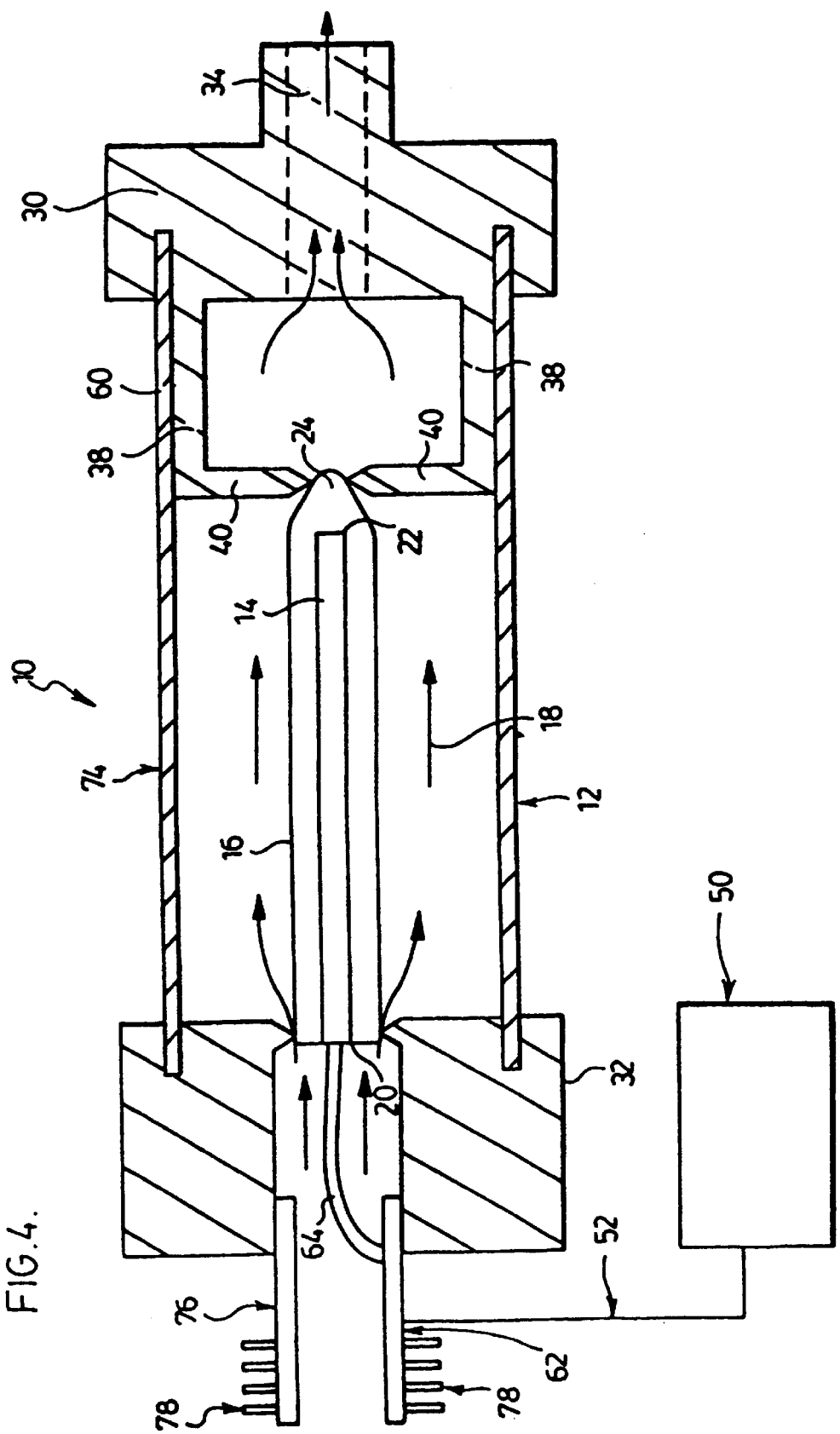
FIG. 4 is a second alternate embodiment of the ozone generator showing a first method of cooling one of the electrodes.

Referring to the embodiment shown in FIG. 4, the heat sink may comprise a plurality of pin fins 78 which are positioned to extend radially outwardly from outer surface 76 of electrically conductive member 62. Pin fins 78 may be air cooled or, alternately, liquid cooled as is generally known in the cooling art (not shown). If pin fins 78 are liquid cooled, then a housing would be mounted around pin fins 78 with at least one inlet port for cooling fluid and at least one outlet port for heated fluid. Heat dissipation means would be provided in the fluid circuit. In order to ensure that heat is dissipated from high voltage electrode 14, electrical conduit 64 has sufficient thermal conductivity to conduct heat from high voltage electrode 14 to electrically conductive member 62. This may be accomplished by having electrical conduit 64 of a higher gauge wire (e.g. 49).

In the embodiment shown in FIG. 5, the heat sink is provided on the exterior surface 74 of ground electrode 12. The heat sink may comprise a plurality of pin fins 78 which extend radially outwardly from outer surface 74 of ground electrode 12. Once again, these pin fins 78 may be air cooled or liquid cooled.

In a further alternate embodiment, high voltage electrode 14 may be directly cooled. For example, an outer dielectric element 80 may be positioned spaced from dielectric element 16 defining cooling fluid conduit 82 which surrounds at least a portion of, and preferably all of, dielectric element 16. Cooling fluid may be fed to cooling fluid conduit 82 by means of inlet conduit 84 in upstream end cap 32. The heated cooling fluid may exit cooling fluid conduit 82 by means of outlet conduit 86 in upstream end cap 32. Accordingly, heat produced by the operation of ozone generator 10 may be directly dissipated by transferring the heat from high voltage electrode 14 to a cooling fluid circulating in cooling fluid conduit 82.

It will be appreciated that various modifications and alterations may be made to the ozone generator and all of these modifications and alterations are within the scope of this invention.

We claim:

1. An apparatus for producing ozone from oxygen comprising:
   (a) a high voltage electrode having an upstream end and a downstream end connectable to a current source;
   (b) a ground electrode spaced from the high voltage electrode and having an upstream end and a downstream end;
   (c) a dielectric element positioned between the high voltage electrode and the ground electrode;
   (d) a passage for air flow positioned between the dielectric element and the ground electrode; and,
   (e) a current collector positioned downstream of the high voltage electrode and comprising an extension of the ground electrode.

2. The apparatus as claimed in claim 1 wherein the current collector is integrally formed as part of the ground electrode.

3. The apparatus as claimed in claim 1 wherein the current collector has a length which is at least ten times the transverse width of the air flow passage positioned between the dielectric element and the ground electrode.

4. The apparatus as claimed in claim 1 wherein the dielectric element substantially encases the high voltage electrode.

5. The apparatus as claimed in claim 1 wherein the dielectric element encases all but the upstream end of the high voltage electrode.

6. The apparatus as claimed in claim 5 wherein the dielectric element is positioned adjacent the high voltage electrode to define a dead air space therebetween.

7. The apparatus as claimed in claim 1 wherein the ground electrode surrounds the dielectric element, the high voltage electrode is positioned in the dielectric element and positioning members are provided to maintain the high voltage electrode substantially centrally positioned within the ground electrode.

8. The apparatus as claimed in claim 1 further comprising an upstream end member and a downstream end member, wherein the ground electrode extends between the end members and surrounding the dielectric element, the high voltage electrode is positioned in the dielectric element and positioning members associated with at least one of the end members are provided to maintain the high voltage electrode substantially centrally positioned within the ground electrode.

9. The apparatus as claimed in claim 8 wherein one of the positioning members is provided adjacent the downstream end of the high voltage electrode and the beginning of the current collector.

10. The apparatus as claimed in claim 8 wherein the upstream end member has an air inlet and the downstream end member has an air outlet such that the air may flow from the air inlet, through the passage between the ground electrode and the dielectric element, through the current collector and through the air outlet.

11. The apparatus as claimed in claim 10 wherein the positioning members engage only a portion of the dielectric element to define a space between the positioning members and the dielectric element for air flow therethrough.

12. The apparatus as claimed in claim 8 further comprising an electrically conductive engagement member connectable to the current source, the high voltage electrode having a tail portion extending outwardly from the dielectric element and engageable with the electrically conductive engagement member, the high voltage electrode connectable to the current source via the engagement of the electrically conductive engagement member and the tail portion, the tail portion is deformed by the engagement of the tail portion with the electrically conductive engagement member.

13. The apparatus as claimed in claim 12 wherein the upstream end member has an air inlet and the electrically conductive engagement member is positioned in the air inlet to define a electrically conductive gas conduit.

14. The apparatus as claimed in claim 1 wherein an outer member is spaced from the dielectric element to define a fluid flow path between the outer member and the dielectric element through which a cooling fluid may flow.

15. The apparatus as claimed in claim 14 wherein the outer member comprises a second dielectric element.

16. The apparatus as claimed in claim 1 further comprising an electrically conductive engagement member connectable to a current source and a heat sink associated with the electrically conductive engagement member, the high voltage electrode being thermally and electrically connected to the electrically conductive engagement member.

17. An apparatus for producing ozone from oxygen comprising:
    (a) a dielectric element having an opening;
    (b) a high voltage electrode having a downstream end, at least a portion of the high voltage electrode positioned in the opening of the dielectric element;
    (c) a ground electrode spaced from the dielectric element and having an upstream end and a downstream end, and a passage for air flow extends between the dielectric element and the ground electrode;
    (d) an upstream sealing member having an air inlet and a downstream sealing member having an air outlet, the sealing members and the ground electrode defining a closed chamber, except for the air inlet and the air outlet, within which the high voltage electrode and the dielectric element are positioned; and,
    (e) a current collector positioned downstream of the high voltage electrode and comprising an extension of the ground electrode.

18. The apparatus as claimed in claim 17 further comprising an electrically conductive member connectable to a current source, the upstream sealing member has a recess therein for receiving the electrically conductive member, the electrically conductive member electrically connecting the high voltage electrode to the current source.

19. The apparatus as claimed in claim 18 wherein the recess extends through the upstream sealing member and is sized for allowing passage of the high voltage electrode there through.

20. The apparatus as claimed in claim 18 wherein the recess comprises an air inlet such that the air may flow from the air inlet, through the passage between the ground electrode and the dielectric element.

21. The apparatus as claimed in claim 20 further comprising positioning members extending between the upstream sealing member and the dielectric element to position the upstream end of the dielectric element spaced from the ground electrode, and openings extending from the air inlet to the air flow passage.

22. The apparatus as claimed in claim 21 wherein the positioning members engage only a portion of the dielectric element to define a space between the positioning members and the dielectric element for air flow therethrough.

23. The apparatus as claimed in claim 17 wherein the downstream sealing member has an engagement member to support the current collector in position downstream of the high voltage electrode.

24. The apparatus as claimed in claim 23 wherein the current collector is integrally formed as part of the ground electrode.

25. The apparatus as claimed in claim 17 wherein the ground electrode surrounds the dielectric element, the high voltage electrode is positioned in the dielectric element and positioning members are provided to maintain the high voltage electrode substantially centrally positioned within the ground electrode.

26. The apparatus as claimed in claim 25 wherein one of the positioning members is provided adjacent the downstream end of the high voltage electrode and the beginning of the current collector.

27. The apparatus as claimed in claim 17 wherein the high voltage electrode is connected to the current source through the air inlet.

28. The apparatus as claimed in claim 17 wherein the air inlet defined by an air inlet member is electrically conductive.

29. The apparatus as claimed in claim 17 wherein each of the sealing members is integrally formed.

30. The apparatus as claimed in claim 29 wherein the sealing members maintain the ground electrode in position and the upstream sealing member supports the upstream end of the high voltage electrode.

31. The apparatus as claimed in claim 30 wherein the downstream sealing member supports the downstream end of the high voltage electrode.

32. The apparatus as claimed in claim 17 wherein the current collector has a length which is at least ten times the transverse width of the air flow passage.

* * * * *